United States Patent
Ihara et al.

(10) Patent No.: US 9,259,793 B2
(45) Date of Patent: Feb. 16, 2016

(54) CLAMPING DEVICE FOR PORTABLE BORING MACHINE AND PORTABLE AIR-DRIVE-DRILLING MACHINE WITH CLAMPING DEVICE

(71) Applicant: SUGINO MACHINE LIMITED, Uozu-shi, Toyama (JP)

(72) Inventors: Minoru Ihara, Uozu (JP); Hideki Uchiuzo, Namerikawa (JP)

(73) Assignee: SUGINO MACHINE LIMITED, Toyama (JP)

( * ) Notice: Subject to any disclaimer, the term of this patent is extended or adjusted under 35 U.S.C. 154(b) by 174 days.

(21) Appl. No.: 14/097,639

(22) Filed: Dec. 5, 2013

(65) Prior Publication Data

US 2014/0154021 A1     Jun. 5, 2014

(30) Foreign Application Priority Data

Dec. 5, 2012     (JP) ................................. 2012-266722

(51) Int. Cl.
| | |
|---|---|
| *B23B 45/14* | (2006.01) |
| *B23B 45/00* | (2006.01) |
| *B23B 47/28* | (2006.01) |

(52) U.S. Cl.
CPC ............... *B23B 45/003* (2013.01); *B23B 47/28* (2013.01); *B23B 2215/04* (2013.01); *B23B 2247/04* (2013.01); *B23B 2247/12* (2013.01); *Y10T 408/557* (2015.01); *Y10T 408/563* (2015.01)

(58) Field of Classification Search
CPC    B23B 47/28; B23B 2215/04; B23B 2247/12; B23B 45/14; B23Q 9/0014; B25H 1/0057; B25H 1/0064; B25H 1/0078
See application file for complete search history.

(56) References Cited

U.S. PATENT DOCUMENTS

| | | | | |
|---|---|---|---|---|
| 2,909,949 | A * | 10/1959 | Winslow | 408/10 |
| 2,911,860 | A * | 11/1959 | Winslow et al. | 408/79 |
| 2,963,927 | A * | 12/1960 | Hanger | 408/79 |
| 3,599,958 | A * | 8/1971 | Schindler | 269/48.1 |
| 3,627,436 | A * | 12/1971 | Adams et al. | 408/63 |
| 3,663,115 | A * | 5/1972 | Vindez et al. | 408/79 |
| 4,011,024 | A * | 3/1977 | Nakano et al. | 408/79 |
| 4,286,902 | A * | 9/1981 | Gagliano et al. | 408/79 |
| 4,310,269 | A * | 1/1982 | Neu et al. | 408/11 |

(Continued)

FOREIGN PATENT DOCUMENTS

| | | | | |
|---|---|---|---|---|
| DE | 2650507 A1 * | 5/1978 | ............. | B23B 47/22 |
| DE | 3205202 A1 * | 8/1983 | ............. | B23B 45/14 |

(Continued)

*Primary Examiner* — Eric A Gates
*Assistant Examiner* — Donte Brown
(74) *Attorney, Agent, or Firm* — Merchant & Gould P.C.

(57) ABSTRACT

A clamping device is attached to a front part of a body of a boring machine for clamping the boring machine and a workpiece together. The clamping device comprises a fixed piston fixed on the front part of the body, a movable piston equipped over the front part of the body movably in the axial direction of a spindle of the boring machine, a first pressure chamber, a second pressure chamber, a pressurized fluid-supply device to supply pressurized air to the first pressure chamber and the second pressure chamber so that the movable cylinder is moved in the axial direction, a connecting mechanism an end portion of which is connected to the movable cylinder, and a clamping unit which is connected to the other end portion of the connecting mechanism, and is fixed to a certain position of the workpiece.

6 Claims, 11 Drawing Sheets

(56) References Cited

U.S. PATENT DOCUMENTS

| | | | |
|---|---|---|---|
| 4,396,318 A * | 8/1983 | Jensen et al. | 408/95 |
| 4,440,529 A * | 4/1984 | Henslee et al. | 408/1 R |
| 4,453,868 A * | 6/1984 | Winslow | 408/138 |
| 4,594,030 A * | 6/1986 | Weigel, Jr. | 408/10 |
| 5,062,746 A | 11/1991 | Deremo | |
| 5,205,682 A * | 4/1993 | Jinkins | 408/79 |
| 5,215,416 A * | 6/1993 | Dessouky | 408/17 |
| 7,083,365 B2 * | 8/2006 | Alam et al. | 408/1 R |
| 7,344,341 B2 * | 3/2008 | Shemeta | 408/79 |
| 2009/0255698 A1 * | 10/2009 | Duran | 173/1 |
| 2010/0247254 A1 * | 9/2010 | Uchiuzo et al. | 408/57 |
| 2013/0108386 A1 * | 5/2013 | Ihara et al. | 408/79 |

FOREIGN PATENT DOCUMENTS

| | | | | |
|---|---|---|---|---|
| DE | 10355351 A1 * | 6/2005 | | B23B 45/14 |
| FR | 2510930 A1 * | 2/1983 | | B23B 45/14 |
| FR | 2510931 A1 * | 2/1983 | | B25H 1/00 |
| FR | 2976832 A1 * | 12/2012 | | B23B 45/14 |
| JP | 6-27006 | 4/1994 | | |
| JP | 08071823 A * | 3/1996 | | B23B 49/00 |
| JP | 2010228049 A * | 10/2010 | | B23B 45/04 |
| JP | 2012101331 A * | 5/2012 | | B23B 45/14 |

* cited by examiner

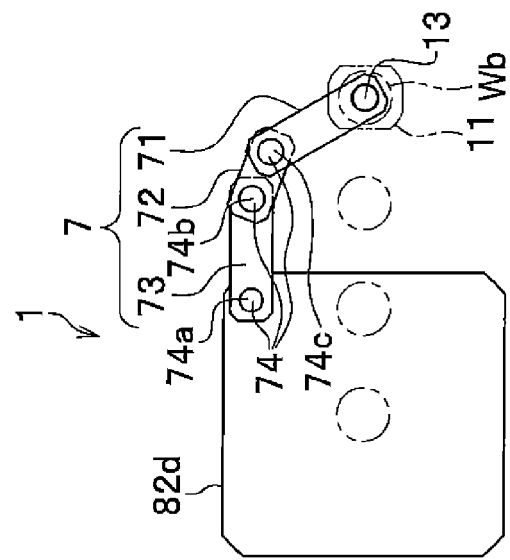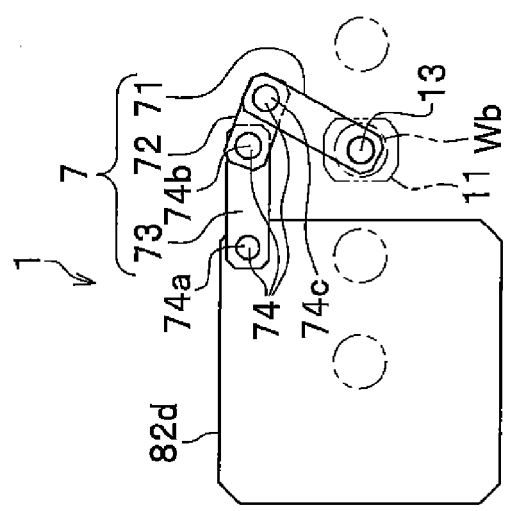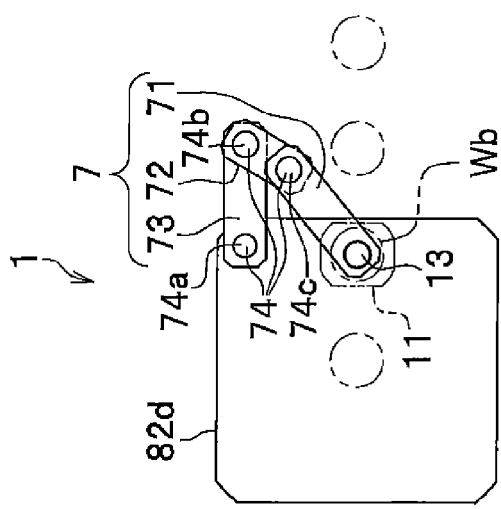

CLAMPING DEVICE FOR PORTABLE BORING MACHINE AND PORTABLE AIR-DRIVE-DRILLING MACHINE WITH CLAMPING DEVICE

CROSS REFERENCE TO RELATED APPLICATIONS

This application claims the foreign priority benefit under Title 35, United States Code, 119 (a)-(d) of Japanese Patent Application No. 2012-266722 which was filed on Dec. 5, 2012 in the Japan Patent Office, the disclosure of which is herein incorporated by reference in its entirety.

BACKGROUND OF THE INVENTION

1. Technical Field

The present invention relates to a clamping device for a portable boring machine which is for boring a workpiece, and a portable air-drive-drilling machine with the clamping device. The clamping device is for clamping the portable boring machine and the workpiece together.

2. Description of Background Art

In a portable boring machine for boring a workpiece, the technique for boring a workpiece while clamping the portable boring machine and the workpiece together in the fixed state so that a position to be bored and posture between the machine and the workpiece are stable when the workpiece is bored, is known (for example, patent literatures 1 and 2). A portable boring machine is disclosed in the patent literature 1, and a cam is driven by a return spring and an air cylinder to enlarge or reduce a head and a collet in diameter, so that the whole of the machine is fixed to the workpiece.

Another portable boring machine is disclosed in the patent literature 2. A collet of a clamping mechanism is enlarged or reduced in diameter by pressing force in a vertical direction along a shaft of a clamping means (the clamping mechanism) connected to the drilling unit, and the pressing force is due to driving force of a motor. In this way, the whole of the machine is fixed to the workpiece.

Patent literature 1: U.S. Pat. No. 3,663,115 (FIG. 3)
Patent literature 2: U.S. Pat. No. 5,062,746 (FIG. 1)

BRIEF SUMMARY OF THE INVENTION

However, the cam is driven by the return spring and the air cylinder disposed in parallel with a nose piece in the boring machine disclosed in the patent literature 1. Therefore, there is a problem that the structure around the front end of the boring machine is complicated and the boring machine is enlarged because of the air cylinder, so that operability of the boring machine turns worse, and chips easily clog the boring machine.

Furthermore, positions of the workpiece and a clamping device are fixed, so a position for fixing a mandrel cannot be adjusted.

The clamping mechanism is driven by the electric motor disposed in parallel with a nose piece in the boring machine disclosed in the patent literature 2. Therefore, control is complicated because of the electric motor, and there is needed a dust-preventing processing for powder dust or mist. Therefore, there is a problem that the structure around the front end of the boring machine is complicated and the boring machine is enlarged.

And, when the electrical control of the clamping mechanism is done, a control system is complicated in a case of adopting an air motor for driving the boring machine. Therefore, there is a problem that operability of the boring machine turns worse and it is hard to control the operational timings.

At least the preferred embodiments of the present invention seek to solve such a problem. It is an object of at least the preferred embodiments of the present invention to provide a clamping device for a portable boring machine which is for boring a workpiece, and a portable air-drive-drilling machine with the clamping device. These apparatus can be downsized and operability can be improved.

The present invention provides a clamping device for a portable boring machine, the clamping device being mounted on a front part of a body of the portable boring machine and being for clamping the portable boring machine and a workpiece together, comprising:

a fixed piston fixed on an outer periphery of the front part of the body;

a movable cylinder covering the fixed piston, the movable cylinder being movable in an axial direction of a spindle of the portable boring machine;

a first pressure chamber and a second pressure chamber which are formed in an inside of the movable cylinder and face each other across the fixed piston in a front-rear direction;

a fluid supply device capable of supplying pressurized fluid into each of the first pressure chamber and the second pressure chamber to move the movable cylinder in the axial direction;

a connecting mechanism an end portion of which is connected to the movable cylinder; and a clamping unit connected to the other end portion of the connecting mechanism, the clamping unit being capable of being fixed to a certain position of the workpiece, wherein the connecting mechanism connects the movable cylinder and the clamping unit so as to move together with the movable cylinder in the axial direction, and wherein the clamping device moves the clamping unit in a direction for clamping and moves the clamping unit in the reverse direction for unclamping through the movable cylinder and the connecting mechanism, using the fluid supply device.

According to the above clamping device, the clamping unit which moves together with the movable cylinder moves forward and rearward over the outer periphery of the front part of the body in parallel with the spindle of the boring machine because of driving force of the movable cylinder. The fixed piston is fixed on the outer periphery of the front part of the body, and the movable cylinder is attached to the front part of the body to cover the fixed piston so that the movable cylinder is disposed to be able to move coaxially with the front part of the body. Therefore, the movable cylinder and the clamping unit can be disposed at a position near an axis of the front part of the body, so that a workpiece is supported with good balance in front of the body and the whole of the apparatus (machine) can be formed simply and compactly. That is, the clamping device can be disposed so that the gravity center of the clamping device is positioned near the axis of the front part of the body. Therefore, when an operator does clamping work or boring work, the operator can stably operate the apparatus without wobbling of the apparatus, so that operability and workability can be improved.

In the clamping device, the clamping unit is fixed to a predetermined position (certain position) of the workpiece to get a clamping state by moving the movable cylinder backward, and is separated from the predetermined position of the workpiece to get an unclamping state by moving the movable cylinder forward. In such a way, the boring machine can be easily clamped to the workpiece at the predetermined position of the workpiece, and can be easily unclamped.

Therefore, according to the clamping device of the present invention, while the clamping unit is positioned at a predetermined position of a workpiece, the boring machine can be moved in a stable state through the connecting mechanism, so that other holes can be bored at correct positions.

Furthermore, the clamping device and the boring machine are integrated, so that a drive system of the clamping device and a drive system of the boring machine can be linked with each other and integrally controlled. Hereby, the control system can be simplified and downsized, so that operability can be improved and the clamping operation can be done at a right timing.

It is preferable that the above clamping device further comprises a guide member for supporting the clamping unit so as to be able to move the clamping unit in the orthogonal direction orthogonal to the axial direction, wherein the connecting mechanism is formed of a link mechanism, and is rotatable around a shaft lengthened in the axial direction relatively to the movable cylinder.

According to the above clamping device, the clamping unit is supported so that the clamping unit can move in the orthogonal direction orthogonal to the axial direction because of the guide member. Therefore, after the clamping unit is positioned at and fixed to the predetermined position of the workpiece, the boring machine can be appropriately moved in the orthogonal direction relatively to the predetermined position. Thus, a plurality of holes can be easily bored at correct positions in a case where the plurality of holes are bored at a plurality of positions in the orthogonal direction by the boring machine.

It is preferable that, in the above clamping device, the clamping unit comprises a clamping collet to be inserted into a hole of the workpiece formed by the portable boring machine, and to be held at the position of the hole of the workpiece;

a mandrel to be slidably inserted into the clamping collet, and the mandrel being fixed to the other end portion of the connecting mechanism;

a spring urging the clamping collet in a forward direction relatively to the mandrel; and a collet guide disposed to be incapable of moving in the axial direction, and the collet guide guiding the clamping collet slidably in the axial direction and regulating the movement of the clamping collet at a predetermined position in the axial direction.

According to the above clamping device, the clamping collet of the clamping unit is inserted into a hole formed in the workpiece, and then, the clamping collet is enlarged or reduced in diameter by sliding the mandrel of the clamping unit. Hereby, clamping the portable boring machine and the workpiece or unclamping the same from the workpiece can be done.

It is preferable that, in the above clamping device, the guide member supports the collet guide so that the collet guide can freely move in the orthogonal direction.

According to the above clamping device, when a plurality of holes are bored in the workpiece by the boring machine, the boring machine can be guided to move along a surface to be bored of the workpiece because the collet guide is supported by the guide member so that the collet guide is movable in the orthogonal direction. Hereby, a hole can be formed (bored) at a desired position of the workpiece, so that efficiency of boring work can be improved.

It is preferable that a portable air-drive-drilling machine with a clamping device, comprising the boring machine and the clamping device in the above, wherein the boring machine is a drilling machine to be driven by pressurized air, and the pressurized fluid is pressurized air, and wherein a clamping button and a start button are independently provided, the clamping button actuating the clamping device for clamping, and the start button actuating the drilling machine for boring.

According to the above portable air-drive-drilling machine with a clamping device, the clamping device and the drilling machine to be driven by pressurized air are respectively driven by pressurized air, so drive systems of the clamping device and of the boring machine (the drilling machine to be driven by pressurized air) can be integrated into a drive system of using pressurized air together, so that the whole of the air-drive-drilling machine with the clamping device can be simplified and downsized. And, the clamping button for actuating the clamping device and the start button for actuating the drilling machine to bore are independently equipped. Therefore, drive timings for the clamping device and the drilling machine to be driven by pressurized air can be controlled, so that boring can be done without error operation for clamping.

By a clamping device for a portable boring machine and a portable air-drive-drilling machine with the clamping device according to the present invention, the device and the machine can be downsized and operabilities can be improved.

BRIEF DESCRIPTION OF THE SEVERAL VIEWS OF THE DRAWINGS

Certain preferred embodiments of the present invention will now be described in greater detail by way of example only and with reference to the accompanying drawings, in which:

FIGS. 9A, 9B and 9C are explanation views showing movement of a connecting mechanism;

DETAILED DESCRIPTION OF THE INVENTION

Figure 1:
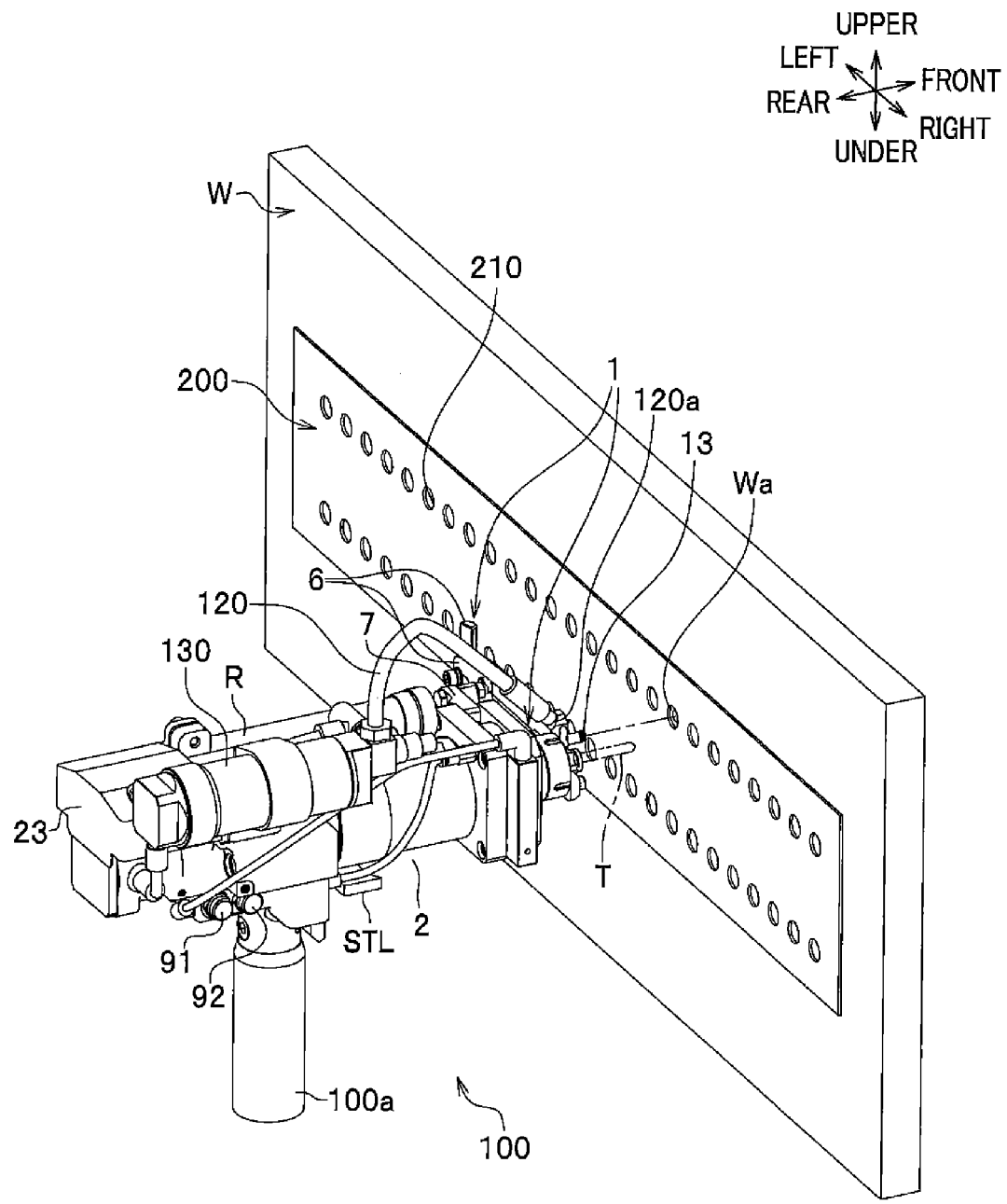
FIG. 1 is a perspective view showing a using state of an air-drive-drilling machine with a clamping device for a boring machine according to an embodiment of the present invention.

A clamping device 1 for a portable boring machine (a portable drilling machine driven by pressurized air 100) and the portable drilling machine driven by pressurized air 100 (hereinafter, drilling machine 100) of an embodiment according to the present invention will be explained with reference to the accompanying drawings in the following. A generic name for the clamping device 1 and the drilling machine 100 is "portable air-drive-drilling machine with a clamping device".

The clamping device 1 is, for example, a device for clamping a boring machine and a workpiece to be bored by the boring machine. A case of use of the drilling machine 100 as the boring machine will be explained for an embodiment of the clamping device 1 according to the present invention in the following.

<Structure of Drilling Machine>

As shown in FIG. 1, the drilling machine 100 (boring machine) may be any boring unit to bore a workpiece W by rotating a boring tool. A drilling device having a boring tool like a drill T will be explained as an example in the following. The drilling device including the drilling machine 100 is a machine to bore a workpiece W by rotating the drill T and moving it forward and rearward (reciprocating motion) with use of driving force of hydraulic pressure, pneumatic pressure, a motor or the like. However, in this description, the drilling machine which rotates the drill T and reciprocates it with use of a power source of pressurized air as pressurized fluid will be explained as an example in the following.

Furthermore, the side where the drill T is attached is "front", the opposite side is "rear", the side where a grip 100a is fixed is "under", the opposite side is "upper", the side of the right hand of the worker gripping the grip is "right" and the opposite side is "left" in the following.

As shown in FIG. 1, the drilling machine 100 is a handy or portable device to bore the workpiece W while a worker not shown holds the grip 100a thereof, a front end part 110 (refer to FIG. 2 and so on) of the drilling machine 100 is inserted into, for example, a guide hole 210 formed in a template 200, and the drilling machine 100 is fixed to the workpiece W by the clamping device 1.

The drill T, as shown in FIG. 1, is a boring tool to bore the workpiece W while being rotated and given mechanical feed. And, in the clamping device 1, a clamping collet 12 to be described later is inserted into a formed hole Wa already bored for positioning it while the clamping collet 12 is reduced in diameter. After that, the clamping collet 12 is enlarged in diameter by a backward movement of a mandrel 13, so that the drilling machine 100 is clamped to the workpiece W.

Figure 2:
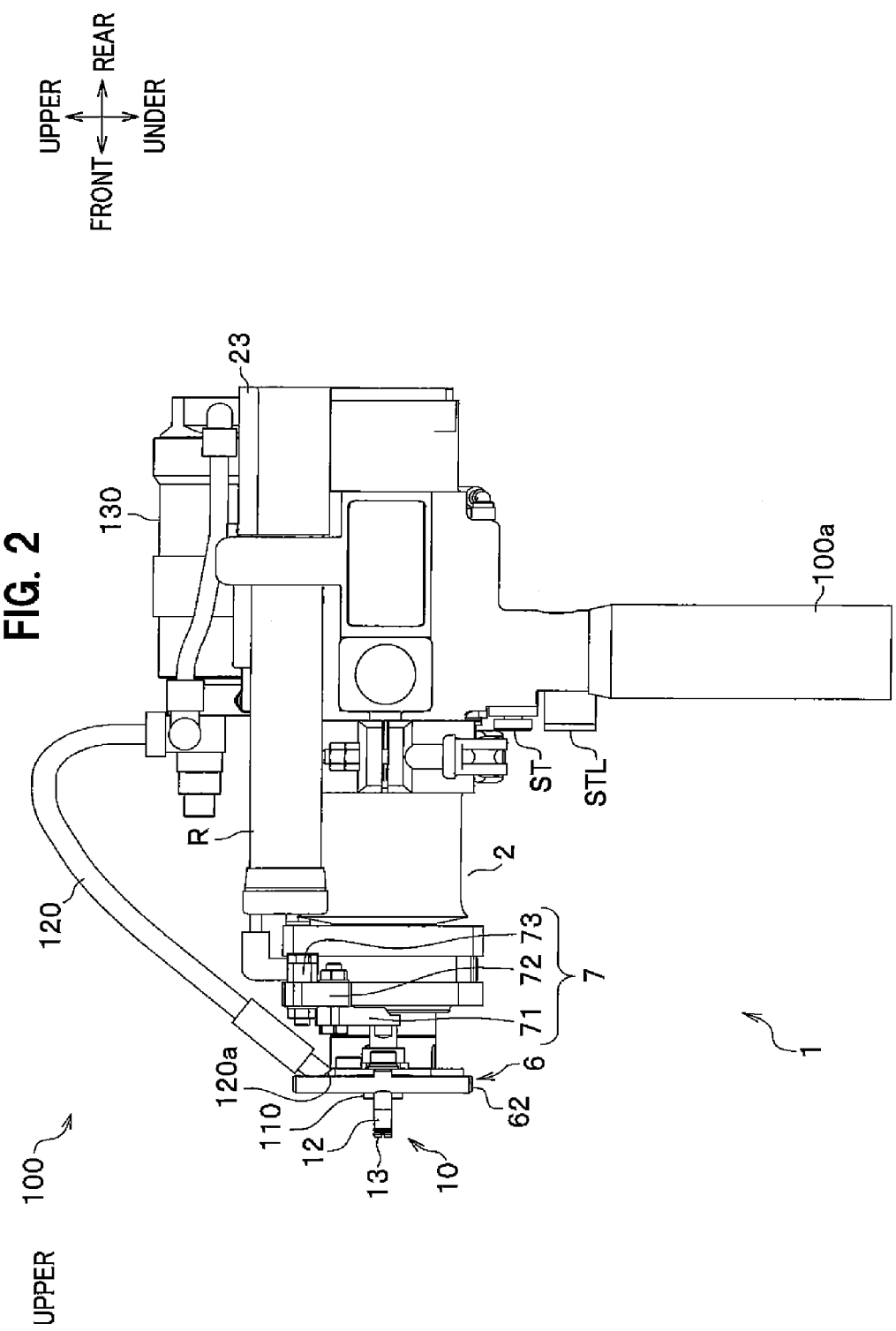
FIG. 2 is a right side view of the air-drive-drilling machine with the clamping device for a boring machine according to the embodiment of the present invention.

As shown in FIG. 2, the drilling machine 100 comprises a mist-air-supply pipe 120 and a regulator R. The mist-air-supply pipe 120 supplies mist air to a portion to be bored out of the tip of the drill T (refer to FIGS. 1, 3). And the regulator R controls feed speed of the drill T when drilling is done. Boring by the drill T is done while mist air is supplied to the portion to be bored, and chips due to the boring are discharged while being collected with use of a dust-collecting pipe (not shown).

Figure 3:
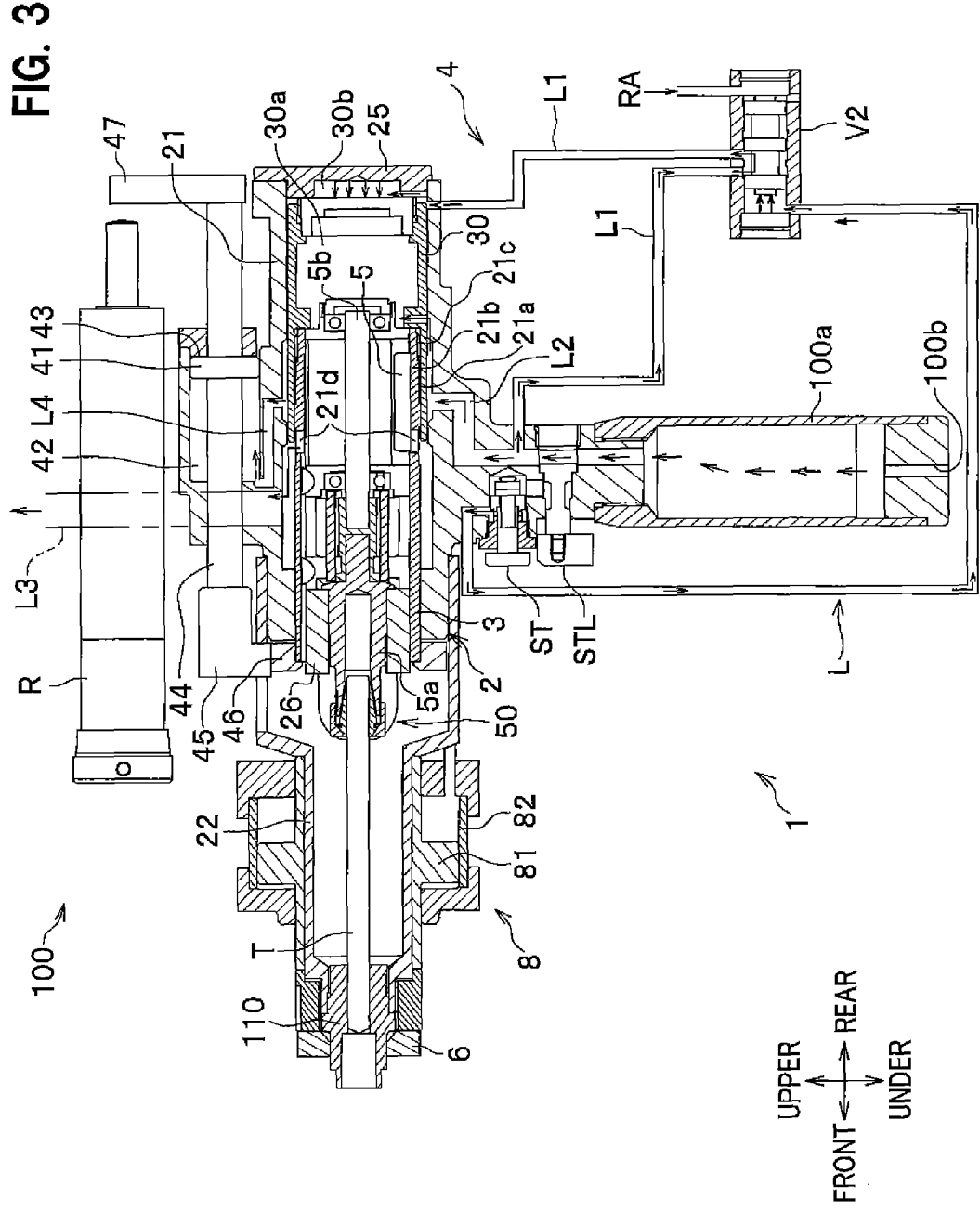
FIG. 3 is a longitudinal sectional view of the air-drive-drilling machine with the clamping device for a boring machine according to the embodiment of the present invention.

As shown in FIG. 3, the drilling machine 100 comprises a housing 21, a ram 3, a center bar 30, an air channel 30a for an air motor, an air chamber 30b behind the center bar, a ram-advancing-force-control mechanism 4, an air motor 5 for a spindle, a channel L1 for advancing, a channel L2 for the air motor, a discharge channel L3, a channel L4 for retreating, a main-air-supply port 100b, a gripping mechanism 50, an adjusting-thrust nut 26, a nose piece 22, a start button ST, and a start-lock button STL.

The housing 21 is a main part of a body 2 and has an approximately cylindrical shape. The ram 3 is inserted into the body 2 (or housing 21) so that the ram 3 can advance and retreat, that is, move forward and rearward. The center bar 30 is extended behind the ram 3. The air channel 30a for the air motor is formed in the center bar 30. The air chamber 30b is formed behind the center bar 30. The ram-advancing-force-control mechanism 4 is a mechanism to control an advance of the ram 3 and the drill T. The air motor 5 for a spindle is a motor to rotate the drill T held in the ram 3. The channel L1 is a channel in which pressurized fluid (pressurized air) to advance the ram 3 flows. The channels L2 and L3 are channels to rotate the air motor 5. The channel L4 is a channel in which pressurized fluid (pressurized air) to retreat the ram 3 flows. The main-air-supply port 100b supplies the pressurized air to each of the channels L1, L2, L3 and L4. The gripping mechanism 50 advances and retreats together with the ram 3 while holding the drill T. The adjusting-thrust nut 26 is disposed in a front part of the body 2 to cover the drill T. The nose piece 22 is disposed in a front part of the body 2, and supports a piston-cylinder mechanism 8 (refer to FIGS. 3, 7, 8, 12). The start button ST is a button to actuate the drilling machine 100 for boring.

FIG. 3 shows the most retreated position of the ram 3 which moves forward and rearward together with the drill T.

<Structure of Body>

As shown in FIG. 3, the housing 21 of the body 2 has a cylindrical shape, and is a housing in which the ram 3, the air motor 5, the center bar 30 and so on are inserted. The body 2 comprises a rear cap 25 screwed to the rear of the housing 21 to close the rear, and the nose piece 22.

A recessed portion 21a forming a part of the channel L4 is formed in a cylindrical shape on the inner portion of the body 2, and a motor-housing part 21b is inserted to cover the recessed portion 21a. Furthermore, a channel aperture 21c is formed to communicate with the recessed portion 21a in the rear end portion of the motor-housing part 21b, and a channel aperture 21d is formed to communicate with the recessed portion 21a in the front end portion of the motor-housing part 21b.

The channel L4 is formed in the housing 21, and communicates with the main-air-supply port 100b and a cylinder chamber 42 formed in an upper part of the body 2.

A regulator R is equipped above the body 2. And a grip 100a is fixed to a lower portion of the body 2. The grip 100a has the main-air-supply port 100b communicating with an air-pressure chamber (not shown) formed on an outer portion of the ram 3.

The ram 3 has a cylindrical shape, is inserted in the body 2, and can reciprocate on the inner surface of the body 2. The center bar 30 is screwed onto the rear part of the ram 3 to be connected together with each other. The ram 3 is a schematically cylindrical member for reciprocating the drill T through the gripping mechanism 50 by using pressurized air, and is inserted in the body 2 to be capable of moving forward and rearward.

For example, a dumper to control advancing and retreating speeds of the ram 3 is extended in a front-rear direction above the body 2, so that the regulator (dumper) R is juxtaposed to the body 2.

The center bar 30 is a member screwed onto the rear part of the ram 3 and extended in an axial direction to close the rear end of the ram 3 as shown in FIG. 3. The air channel 30a is formed in the inside of the center bar 30, and the air chamber 30b communicating with the channel L1 is formed behind it.

A piston 41 is a member to move forward and rearward in connection with advancing and retreating of the ram 3. The piston 41 is formed integrally with a piston rod 44 extending in the front-rear direction, and the piston rod 44 advances or retreats in the front-rear direction while sliding in shaft holes formed in an end wall of the cylinder chamber 42 and in an end wall of a chamber 43 for opening to the atmosphere. The piston 41 is forced to move rearward by the force of pressurized fluid (pressurized air) flown into the cylinder chamber 42. Therefore, driving force for advancing the ram 3 and so on is generated by the force multiplying the pressure of the pressurized fluid by the value subtracted a cross sectional area of the cylinder chamber 42 from a cross sectional area of the air chamber 30b.

The cylinder chamber 42 is a pressure chamber to retreat the ram 3, and is formed in front of the piston 41. The pressurized air is always supplied to the cylinder chamber 42 through the channel L4 formed in the body 2.

The chamber 43 is formed in the upper part of the body 2 positioned above an outer peripheral portion of the ram 3, and is formed behind the piston 41 to open to the atmosphere.

As shown in FIG. 3, the piston 41 is disposed on the middle portion of the rod 44, a guide-bar holder 45 and a guide-bar ring 46 are attached to the front end portion of the piston rod 44, a regulator stopper 47 and a screw supporter 48 (refer to FIG. 4) are attached to the rear end portion of the piston rod 44, and these members 41, 44, 45, 46, 47, and 48 move integrally forward and rearward.

The regulator stopper 47 is configured to press the regulator R to control feed speed of the piston rod 44 when the piston rod 44 advances to a predetermined position.

Figure 4:
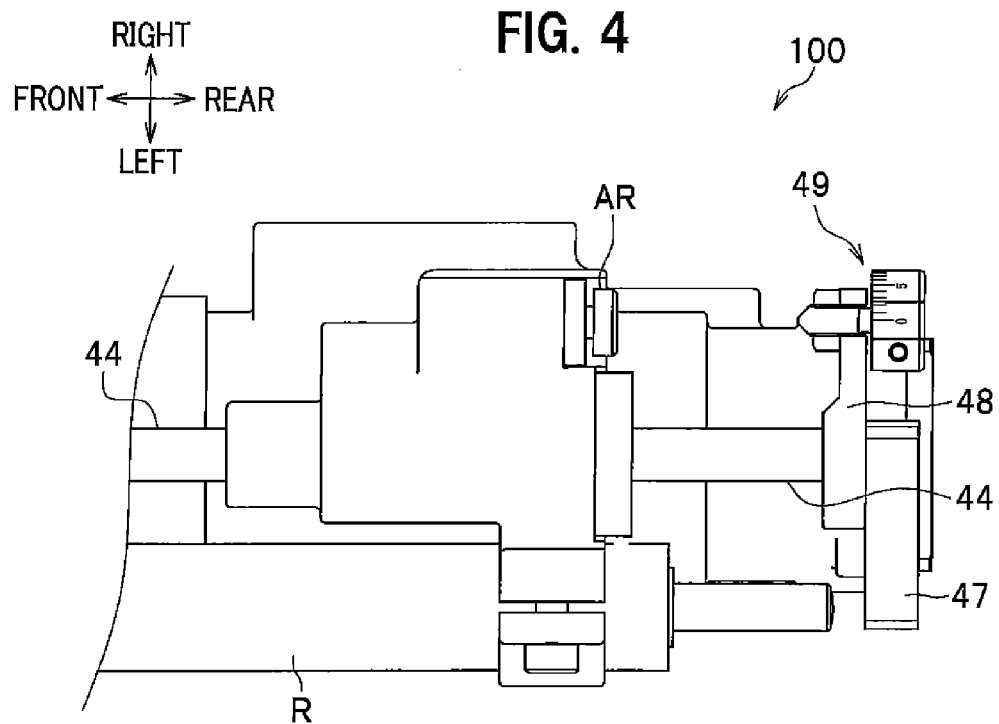
FIG. 4 is a partial enlarged side view of the air-drive-drilling machine with the clamping device for a boring machine according to the embodiment of the present invention when a cover member is removed.

FIG. 4 is an enlarged partial plan view showing a rear part of the drilling machine 100 from which a cover 23 (refer to FIG. 1) equipped on the rear part of the body 2 is removed. As shown in FIG. 4, the screw supporter 48 equipped with a micro-adjust screw 49 is equipped on a rear portion of the piston rod 44. The micro-adjust screw 49 detects an advancing end of the piston rod 44 when the piston rod advances.

The micro-adjust screw 49 is a controller to regulate the advancing movement of the piston rod 44, so that the length of the movement is adjustable in the front-rear direction. The micro-adjust screw 49 is configured to push an automatic return button AR when it moves to a predetermined position while advancing together with the piston rod 44 and the screw supporter 48.

Figure 5:
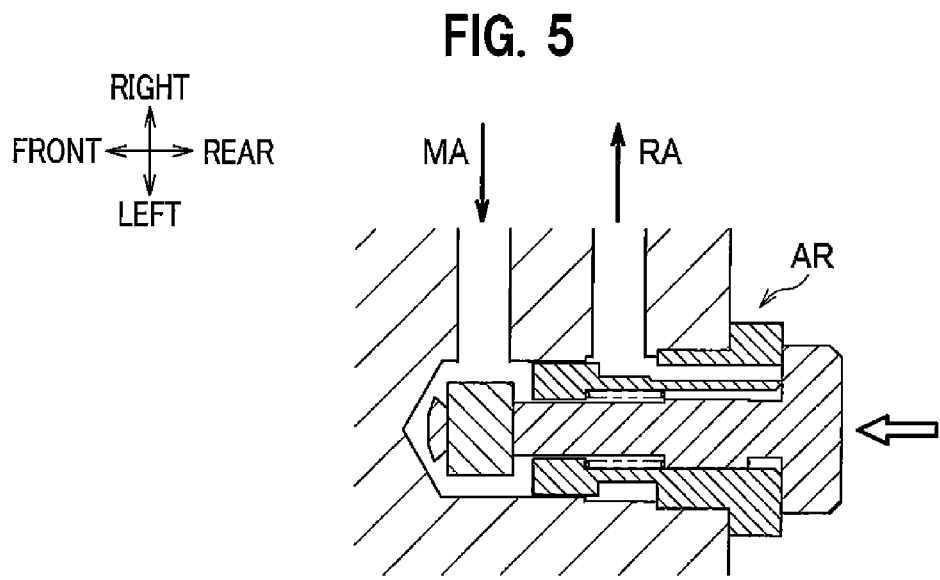
FIG. 5 is an enlarged sectional view showing an embodiment of an automatic return button.

As shown in FIG. 5, the automatic return button AR is a valve of a part of the ram-advancing-force-control mechanism 4 (FIG. 3), regulates the advancing movement of the piston rod 44, and changes flows of main air MA and return air RA, so that the return air RA is flown into a spool valve V2. Hereby, pressurized air to be supplied to the air chamber 30b through the channel L1 is stopped being supplied.

<Structure of Air Motor for Spindle>

As shown in FIG. 3, the air motor 5 is a motor to rotate the drill T through the gripping mechanism 50. For example, the air motor 5 is rotated by pressurized air supplied to an air-motor chamber (not shown) from a pressurized air-supply source (not shown in FIG. 3). A spindle 5a of the air motor 5 is connected to the drill T at a front end portion thereof through the gripping mechanism 50 for gripping the drill T. The air motor 5 is disposed at a little more rearward position than the middle of, and inside the ram 3. The spindle 5a is rotated together with a motor shaft 5b by pressurized air supplied through the channel L2, so that boring work is done by the drill T attached to the spindle 5a.

Furthermore, the air motor 5 may be a motor capable of rotating the drill T, that is, may be an electric motor or a hydraulic motor driven by oil pressure.

<Structure of Air Channel>

A channel L is a channel to supply pressurized air supplied from the pressurized air-supply source to the main-air-supply port 100b, the start button ST, the start-lock button STL, the spool valve V2, the air motor 5, and the piston-cylinder mechanism 8 (refer to FIG. 7) through the ram-advancing-force-control mechanism 4 and so on, has a hose for air flow to communicate with each of the channels L1, L2, L3 and L4. The air motor 5 and the piston-cylinder mechanism 8 are driven to rotate or move linearly by the pressurized air through the channel L.

As shown in FIG. 1, mist air supplied to a mist-supply port 120a through a mist air-supply pipe 120 from a mist tank 130 is jet to the drill T by operating the start button ST (refer to FIGS. 2 and 3) and the start-lock button STL.

The mist air is supplied to a portion to be bored through a through hole (not shown) formed through and to the tip of the drill T through the mist air-supply pipe 120 and the mist-supply port 120a.

Figure 6:
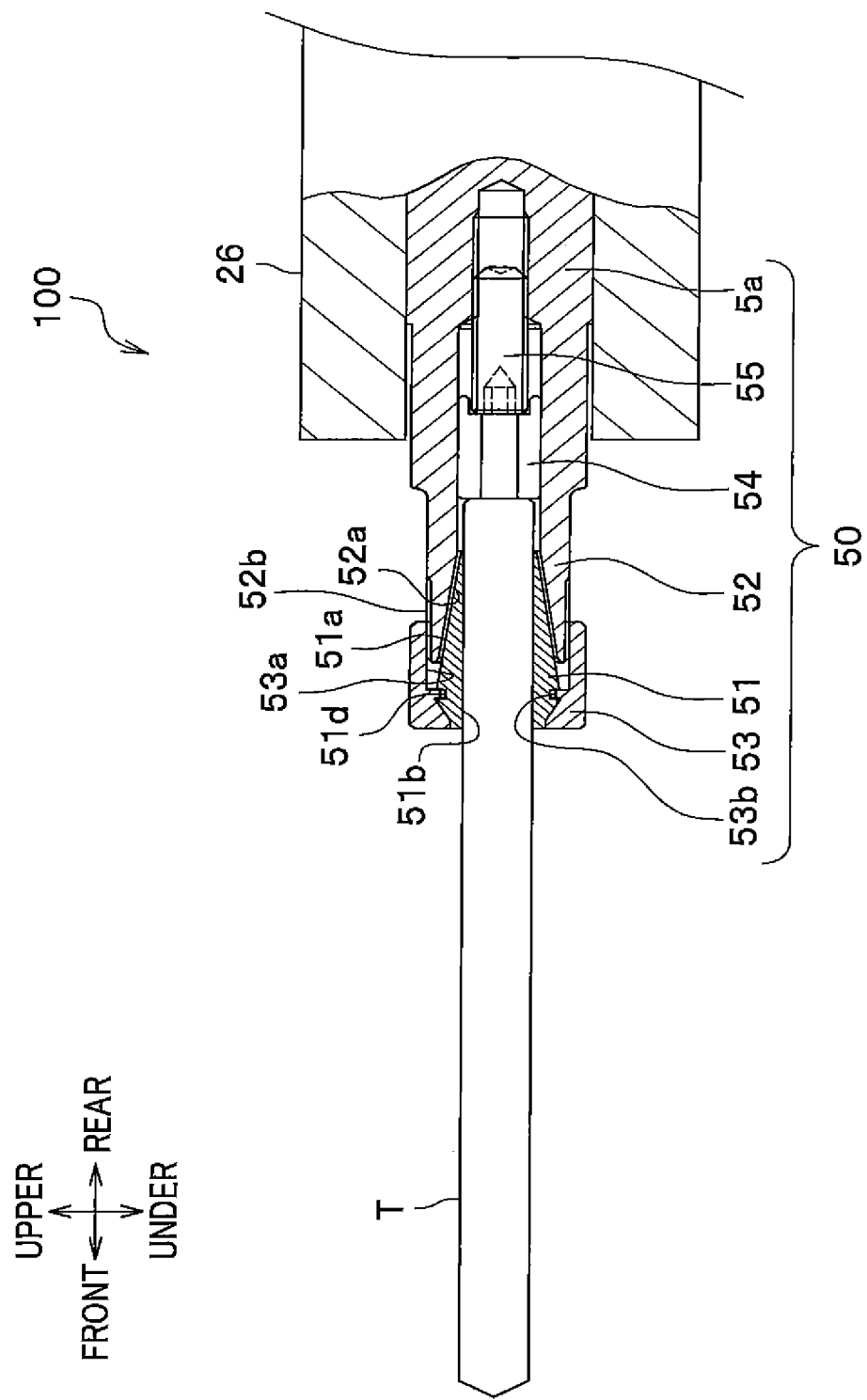
FIG. 6 is a partial schematic sectional view showing a drill held by a gripping mechanism of a boring machine according to the embodiment of the present invention.

As shown in FIG. 3, the gripping mechanism 50 grips the drill T detachably, and is a connecting unit to transfer the rotation of the air motor 5 to the drill T. As shown in FIG. 6, the gripping mechanism 50 comprises a collet 51 for a drill, a collet holder part 52, a collet nut 53, a plug 54 and a set screw 55. The collet 51 grips the drill T. A front end part of the spindle 5a is formed as the collet holder part 52 in which the collet 51 is inserted. The collet nut 53 fixes the collet 51 to the collet holder part 52. The plug 54 is equipped just behind the drill T, and adjusts projecting length of the drill T. And the set screw 55 presses the rear surface of the drill T through the plug 54 to adjust the projecting length of the drill T.

As shown in FIG. 6, the collet 51 is a schematically cylindrical member to be attached with the rear end part of the drill T, and has a tapered expandable part 51a to be inserted in and fitted to an expandable part 52a of the collet holder part 52 formed in a forward expanding shape. The collet 51 has the tapered expandable part 51a, a hole 51b for inserting and gripping the drill T, a plurality of slits (not shown) to let the collet 51 easily deform elastically in the radial direction, and an engagement groove 51d of an annular groove.

The collet nut 53 is a fixing part to fix the collet 51 to the collet holder part 52, and has a female thread portion 53a to be screwed onto a male thread portion 52b of the collet holder part 52 in a state where a head of the collet 51 is inserted in the collet holder part 52, and an engagement projection 53b to be engaged with an engagement groove 51d formed on the outer periphery of the collet 51.

The collet holder part 52 is a schematically cylindrical member formed in the front end part of the spindle 5a. The collet holder part 52 has the expandable part 52a and the male thread portion 52b. The expandable part 52a presses the expandable part 51a of the collet 51 toward the axis to reduce it in diameter so that the drill T is fixed to the collet 51, when the collet nut 53 is screwed onto the male thread portion 52b.

The male thread portion 52b is screwed onto the female thread portion 53a, so that the male thread portion 52b fixes the collet nut 53, the collet 51 and the drill T integrally with the spindle 5a.

As shown in FIG. 6, the adjusting-thrust nut 26 is a cover member which is disposed in the front portion of the housing 21 of the body 2 (refer to FIG. 3) to cover the spindle 5a, and is positioned behind the gripping mechanism 50.

Figure 7:
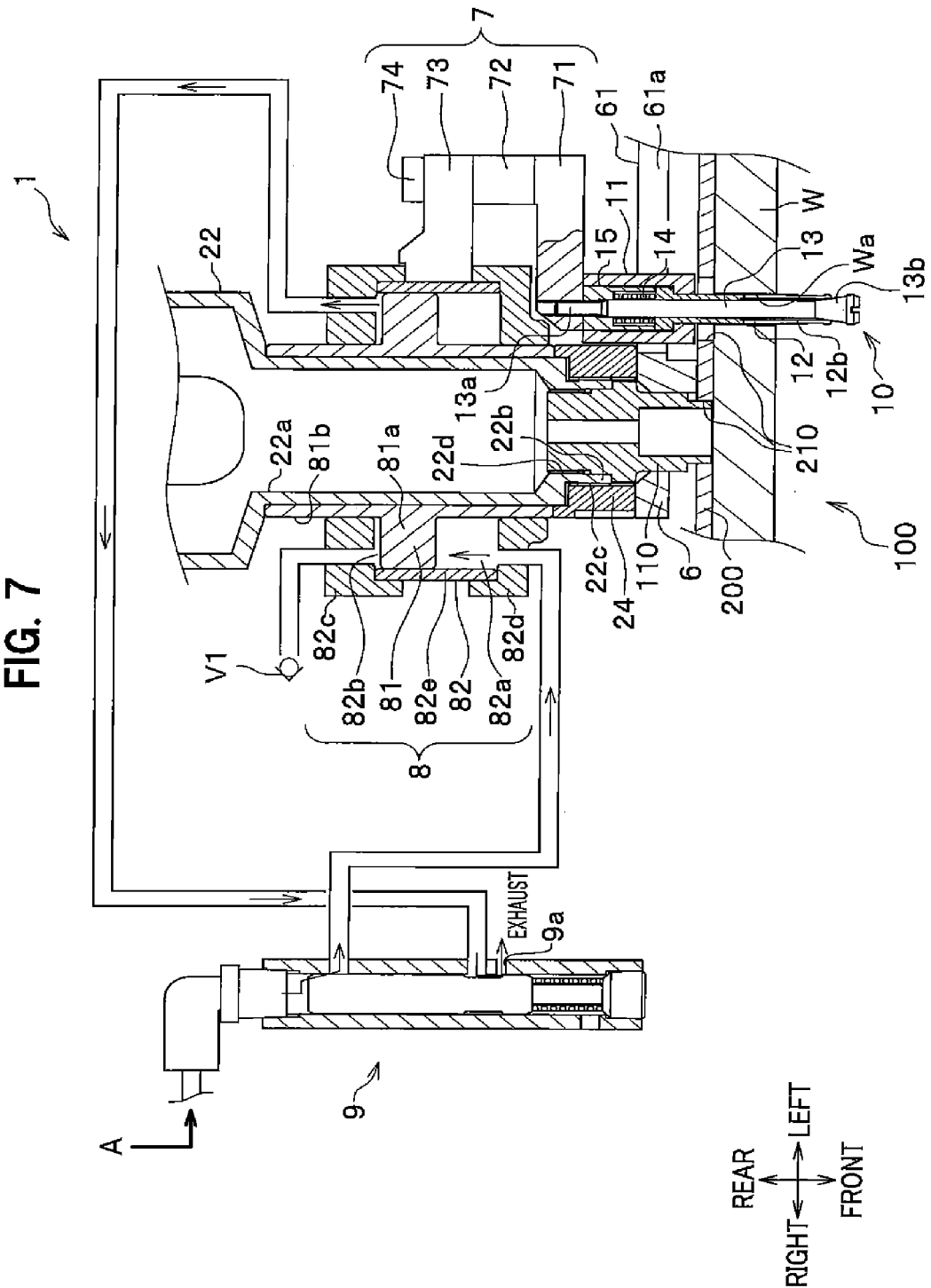
FIG. 7 is a partial schematic sectional view showing an unclamping state of the clamping device for a boring machine according to the embodiment of the present invention, and omitting an illustration of the drill.

As shown in FIG. 7, the front end part 110 of the drilling machine 100 is screwed onto a female thread portion 22d formed in a front end portion of the nose piece 22. A connecting nut 24 is screwed onto a male thread portion 22c formed on an outer periphery of the front end portion of the nose piece 22. The piston-cylinder mechanism 8 is equipped on an outer periphery of the nose piece 22, and a connecting mechanism 7 of a link mechanism is equipped on the left side of the nose piece 22.

<Structure of Clamping Device>

Figure 8:
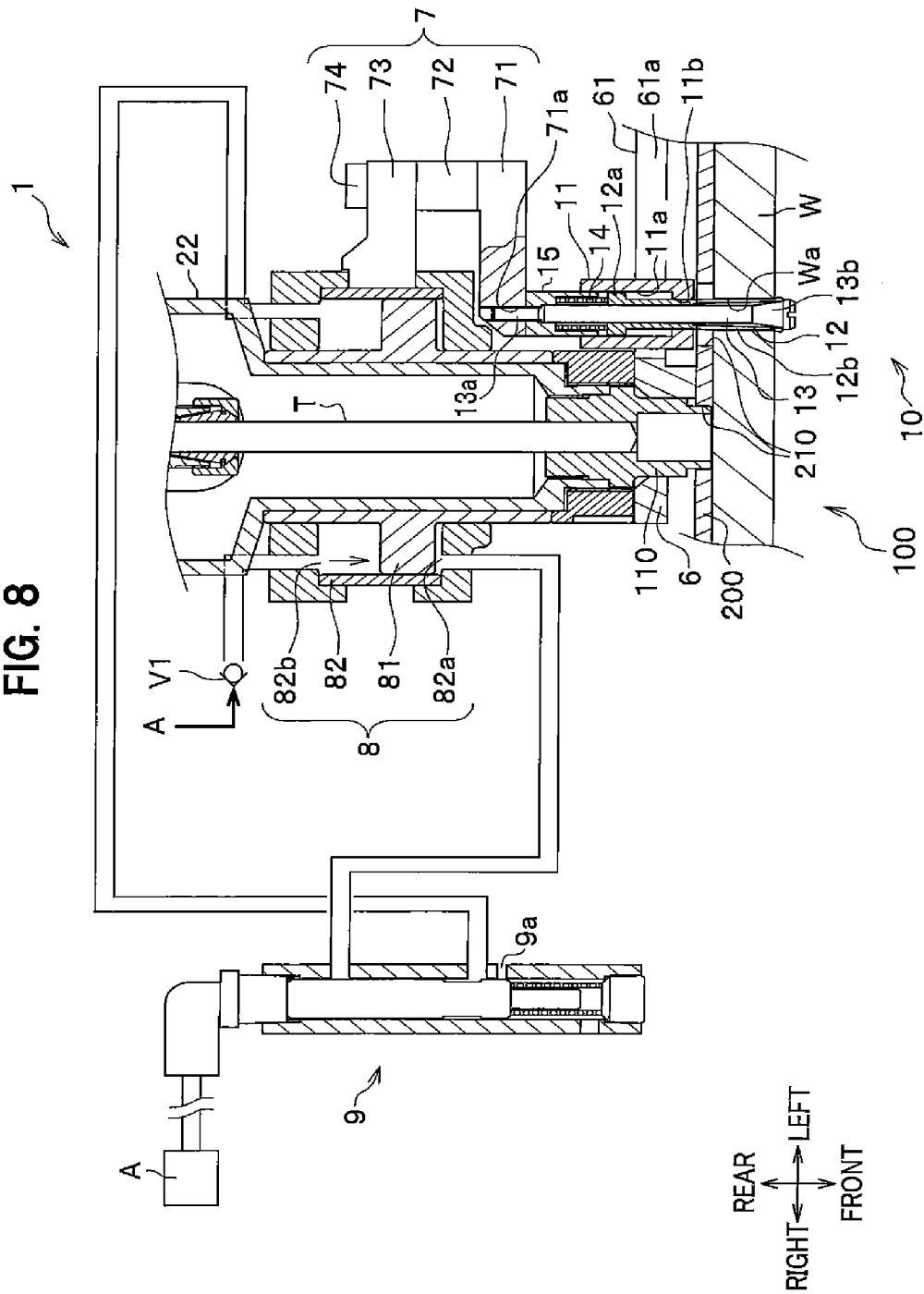
FIG. 8 is a partial schematic sectional view showing a clamping state of the clamping device for a boring machine according to the embodiment of the present invention.

As shown in FIG. 7 and so on, the clamping device 1 is attached to the nosepiece 22 of the drilling machine 100, and is a device to clamp the drilling machine 100 to a workpiece W with the template 200 when the template is used. The clamping device 1 is disposed on the front part of the drilling machine 100. When clamping is done, first, pressurized air is supplied to the piston-cylinder mechanism 8, so that the clamping device 1 is driven to advance the mandrel 13 of the clamping unit 10 through the connecting mechanism 7. And the clamping collet 12 is inserted into a guide hole 210 of the template 200 and a formed hole Wa of the workpiece W already bored to make unclamping state. After that, as shown in FIG. 8, pressurized air is supplied along a route for clamping to retreat the mandrel 13 into the clamping collet 12. Hereby, the clamping collet 12 is enlarged in diameter to be engaged with the formed hole Wa so as to be positioned at and fixed to the formed hole Wa, so that the drilling machine 100 is clamped to the workpiece W and the template 200.

As shown in FIG. 7, the clamping device 1 comprises the piston-cylinder mechanism 8 equipped on the front part of the body 2, a pressurized fluid-supply device (pressurized air-supply source) A to supply pressurized air to the piston-cylinder mechanism 8 to drive it, the connecting mechanism 7 connected to a movable cylinder 82 of the piston-cylinder mechanism 8 with one end portion of the connecting mechanism 7, and the clamping unit 10 connected to the other end portion of the connecting mechanism 7 and to be fixed to one of formed holes Wa bored in the workpiece W for use of fixing. Furthermore, the clamping device 1 comprises a clamping button 92 and an unclamping button 91 (refer to FIG. 1). The clamping button 92 is a button to drive the clamping device 1 for clamping. The unclamping button 91 is a button to hold the clamping button 92 to be unclamping state.

<Structure of Piston-Cylinder Mechanism>

As shown in FIG. 7, the piston-cylinder mechanism 8 is attached to the drilling machine 100, that is, is disposed on the outer periphery of the front part of the nose piece 22, and is a piston-cylinder mechanism to be driven by pressurized air to clamp and unclamp the workpiece W because of retreating or advancing the clamping unit 10. The piston-cylinder mechanism 8 comprises a fixed piston 81, a movable cylinder 82, a front pressure chamber 82a, a rear pressure chamber 82b and the pressurized fluid-supply device A. The fixed piston 81 is fixed on the outer periphery of the nose piece 22. The movable cylinder 82 is equipped over the fixed piston 81 on the nose piece 22 so as to be movable in the axial direction of the drilling machine 100 (boring machine). The front and rear pressure chambers 82a and 82b are formed in the inside of the movable cylinder 82 and in front of or behind an annular piston part 81a of the fixed piston 81, respectively. And the pressurized fluid-supply device A supplies pressurized fluid to the front pressure chamber 82a or the rear pressure chamber 82b to move the movable cylinder 82 in the axial direction.

The fixed piston 81 has the annular piston part 81a and a cylindrical part 81b on the outer periphery of which the piston part 81a is integrally equipped. The fixed piston 81 is fit onto a stepped cylindrical-middle-size part 22a (hereinafter, middle part 22a) formed on a front part of the nosepiece 22. Furthermore, the fixed piston 81 is fixed with use of the connecting nut 24 screwed onto a male thread portion 22c formed on an outer periphery of a small part 22b in front of the middle part 22a.

The movable cylinder 82 is equipped over the fixed piston 81 and is a member movable forward and rearward in the axial direction of the drilling machine 100. The mandrel 13 is connected to the movable cylinder 82 through the connecting mechanism 7. The movable cylinder 82 has a cylinder chamber of the front pressure chamber (first pressure chamber) 82a formed in front of the piston part 81a and the rear pressure chamber (second pressure chamber) 82b formed behind the piston part 81a partly defined by the fixed piston 81 as boundary walls. The movable cylinder 82 has a cylindrical part 82e, a rear end cover part 82c and a front end cover part 82d. The cylindrical part 82e is disposed on the outer periphery of the piston part 81a and is movable forward and rearward. The rear end cover part 82c is disposed slidably on a rear part of the cylindrical part 81b to close the rear end side of the cylindrical part 82e to define the rear pressure chamber 82b, and is movable forward and rearward with the cylindrical part 82e. The front end cover part 82d is disposed slidably on a front part of the cylindrical part 81b to close the front end side of the cylindrical part 82e to define the front pressure chamber 82a, and is movable forward and rearward with the cylindrical part 82e.

As shown in FIG. 7, when pressurized air is supplied to the front pressure chamber 82a in the piston-cylinder mechanism 8, the mandrel 13 is moved forward in the clamping collet 12 to reduce the clamping collet 12 in diameter. Hereby, the drilling machine 100 is unclamped from the workpiece W.

As shown in FIG. 8, when the pressurized air is supplied to the rear pressure chamber 82b, the mandrel 13 is moved rearward in the clamping collet 12 to enlarge the clamping collet 12 in diameter in the formed hole Wa. Hereby, the drilling machine 100 is clamped to the workpiece W. An pressurized air-supply channel between the pressurized fluid-supply device A and the rear pressure chamber 82b is equipped with a check valve V1 to keep the clamping state by preventing a back flow of the pressurized air supplied to the rear pressure chamber 82b. Even if pressurized air is supplied to the front pressure chamber 82a in the clamping state, the check valve V1 prevents the pressurized air in the rear pressure chamber 82b from flowing backward. Hereby, the movable cylinder 82 is prevented from moving to a position of the unclamping state.

As shown in FIG. 7, the front pressure chamber 82a and the rear pressure chamber 82b are communicated with a switching valve 9 through pipes. The switching valve 9 switches the clamping state and the unclamping state. In FIG. 7, the switching valve 9 is switched to supply pressurized air to the front pressure chamber 82a from the pressurized fluid-supply device A, while the pressurized air out of the rear pressure chamber 82b is exhausted to the atmosphere through an exhaust port 9a, so that the unclamping state is attained.

If a pressure-reducing valve to adjust the pressure of supplied pressurized air is equipped, a clamping force can be adjusted, while the pressure-reducing valve is not shown in the present embodiment. Hereby, the workpiece W can be prevented from being damaged because of an excess-retreating force of the mandrel, or from being deformed because of the thinness thereof, by adjusting the clamping force in accordance with the materials or the like of the workpiece W.

<Structure of Connecting Mechanism>

The connecting mechanism 7 is a link mechanism to connect the clamping unit 10 to be detachably attached to a workpiece W to the movable cylinder 82 movable forward and rearward relatively to the nose piece 22 so that the clamping unit 10 can move in an orthogonal direction orthogonal to the axis. The connecting mechanism 7 comprises a first clamp arm 71, a second clamp arm 72, a third clamp arm 73 and a plurality of clamp bolts 74. The third clamp arm 73 is rotatably connected to the movable cylinder 82 on the base end side thereof. The second clamp arm 72 is rotatably connected to the front end side of the third clamp arm 73 on the base end side thereof. The first clamp arm 71 is rotatably connected to the front end side of the second clamp arm 72 on the base end side thereof, and is connected to a collet adjuster 15 on the front end side thereof. The plurality of clamp bolts 74 connect the first, the second and the third clamp arms 71, 72 and 73, respectively. And the connecting mechanism 7 moves the clamping unit 10 disposed to extend orthogonally to the first clamp arm 71 in the orthogonal direction orthogonal to the axis.

As shown in FIGS. 9A, 9B and 9C, the third clamp arm 73 is connected to the upper left corner portions of the front end cover part 82d and the rear end cover part 82c integrated with the movable cylinder 82 on the base end side thereof with a bolt 74a (74).

The second clamp arm 72 and the third clamp arm 73 are connected to each other with a bolt 74b (74), so that the second clamp arm 72 is supported swingably around the bolt 74b.

The second clamp arm 72 and the first clamp arm 71 are connected to each other with a bolt 74c (74), so that the first clamp arm 71 is supported swingably around the bolt 74c.

Figure 10:
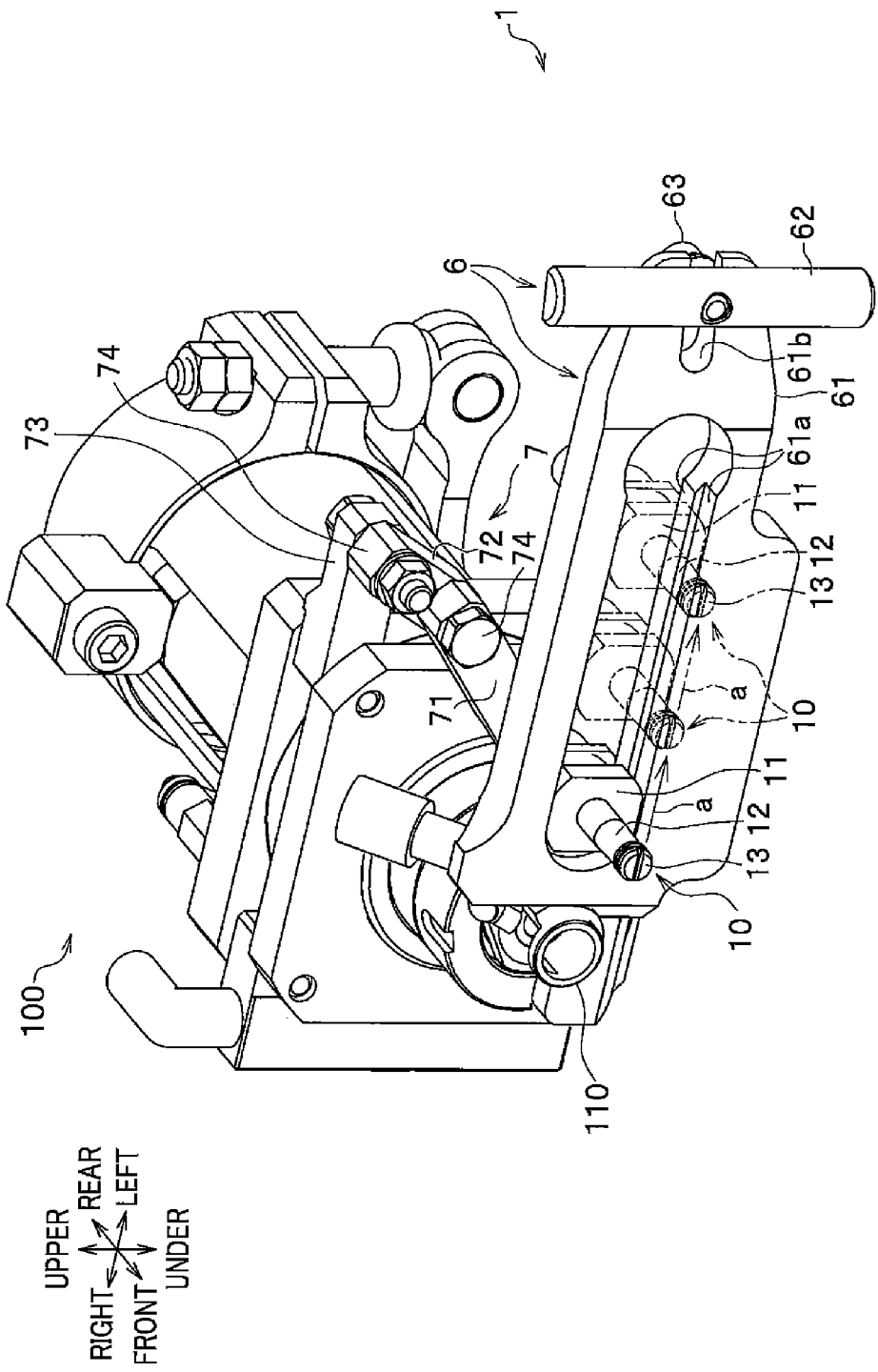
FIG. 10 is a perspective view viewed from the front side and showing the air-drive-drilling machine with the clamping device for a boring machine according to the embodiment of the present invention.

As shown in FIGS. 8 and 10, the first clamp arm 71 has a female thread portion 71a on the front end side thereof, to be screwed onto a male thread portion 13a formed on the base end side of the mandrel 13 engaged with a guide part 61a of the slide-support mechanism 6 through a collet adjuster 15 and a collet guide 11. The collet adjuster 15 fitted slidably forward and rearward on an inner surface of the collet guide 11 is equipped on the first clamp arm 71 by screwing the mandrel 13.

As shown in FIG. 10, the collet guide 11 and the mandrel 13 are attached to the first clamp arm 71, so that the form of the link mechanism of the connecting mechanism 7 is changed when the collet guide 11 is moved in the orthogonal direction (the arrow a) while being guided along the guide part 61a of the slide-support mechanism 6. And the connecting mechanism 7 supports the clamping unit 10 so that the connecting mechanism 7 can rotate around an axis along the axial direction relatively to the movable cylinder 82.

<Structure of Clamping Unit>

As shown in FIG. 8, the clamping unit 10 is a unit to attach and detach a front end portion of the drilling machine 100 to and from a predetermined position (certain position) of the workpiece W. For example, the clamping unit 10 is such a clamping equipment that the mandrel 13 is driven to enlarge the clamping collet 12 in diameter while retreating the clamping collet 12 by driving force due to the movement of the movable cylinder 82 and through the connecting mechanism 7. Hereby, the clamping equipment clamps the clamping collet 12 onto a formed hole Wa already bored in the workpiece W, and unclamps it by moving it forward.

The clamping unit 10 comprises the clamping collet 12, the mandrel 13, a spring 14, the collet adjuster 15 and the collet guide 11. The clamping collet 12 is inserted into a formed hole Wa of the workpiece W and is fixed to the workpiece W. The mandrel 13 is fixed to the front end portion (the other end portion) of the connecting mechanism 7 and is inserted in the clamping collet 12 to be slidable. The spring 14 urges the clamping collet 12 forward relatively to the mandrel 13. The collet adjuster 15 is fixed to the first clamp arm 71 and supports the spring 14. The collet guide 11 is equipped so as not to move in the axial direction, and guides the clamping collet 12 slidably and regulates the movement of the clamping collet at a predetermined position in the axial direction.

Furthermore, the clamping unit 10 may be a unit capable of at least fixing and detaching the front end portion of the drilling machine 100 to and from a predetermined position of the workpiece W. For example, it may be a magnetic type unit or other type one.

As shown in FIG. 8, the collet guide 11 is a cylindrical member having a large hole 11a and a small hole 11b. The collet guide 11 is engaged with a guide part 61a of a guide plate 61 described later on the outer periphery thereof, and is supported movably in the orthogonal direction along a surface of the workpiece W within the guide part 61a. The collet adjuster 15 and an engagement part 12a of a base part of the clamping collet 12 are inserted in the large hole 11a of the collet guide 11 slidably forward and rearward, and the clamping collet 12 is inserted in the small hole 11b so that an outer periphery of the clamping collet 12 is slidable. The engagement part 12a is configured to be engaged with the step wall between the large hole 11a and the small hole 11b when the clamping collet 12 is advancing.

The clamping collet 12 is a cylindrical member having the engagement part 12a like an annular flange part formed on the rear end thereof and a plurality of straight slits 12b directed in the axial direction and disposed in the circular direction. The clamping collet 12 is enlarged in diameter to clamp the drilling machine 100 to the workpiece W when the mandrel 13 equipped through the clamping collet 12 is moved rearward. On the other hand, the clamping collet 12 is reduced in diameter to unclamp the drilling machine 100 from the workpiece W when the mandrel 13 is moved forward. The clamping collet 12 is configured to perform the enlargement and the reduction in diameter smoothly and stably with respect to a thickness thereof and a shape of each slit 12b.

As shown in FIG. 8, the mandrel 13 is a schematically cylindrical member slidably inserted in the clamping collet 12, and has the male thread portion 13a formed on the rear end part thereof and a tapered part 13b enlarged as proceeding forward and formed on the front end part thereof. The mandrel 13 is screwed onto the front end portion of the first clamp arm 71 with the clamping collet 12, the spring 14 and the collet adjuster 15 by using the male thread portion 13a. The tapered part 13b is a part to urge the clamping collet 12 having the slits 12b outward to expand it when the movable cylinder 82 retreats.

The spring 14 is a compression coil spring always urging the clamping collet 12 forward, and is equipped in the collet adjuster 15.

The collet adjuster 15 is a cylindrical member having a step wall and fixed to the first clamp arm 71 through the male thread portion 13a of the mandrel 13. The step wall receives the spring 14. A rear part of the mandrel 13 and the spring 14 are inserted in the collet adjuster 15, and the collet guide 11 is fit onto the collet adjuster 15 movably forward and rearward.

<Structure of Slide-Support Mechanism>

As shown in FIG. 10, the slide-support mechanism 6 is a device to support the collet guide 11 movably in the orthogonal direction, and comprises a clamping plate 61, a height-adjusting plate 62 and a bolt 63. The clamping plate 61 guides the collet guide 11 movably. The height-adjusting plate 62 is connected to the clamping plate 61 and adjusts a distance (height) from a surface of the workpiece W or of the template 200 disposed on the workpiece W when the template is used, to the rear. And the bolt 63 adjusts the height. The clamping plate 61 is attached to a front end portion of the drilling machine 100 in a fixed state.

The clamping plate 61 is configured to have the guide part 61a and a cut part (notch) 61b. The guide part 61a supports the collet guide 11 inserted thereinto movably in the orthogonal direction orthogonally to the axis of the drill T attached to the drilling machine 100, for example, in the horizontal direction. And the bolt 63 is inserted through the cut part 61b. The clamping plate 61 is extended in the horizontal direction, the right end portion of the clamping plate 61 is joined to a front end portion of the nose piece 22 of the drilling machine 100, and the height-adjusting plate 62 to abut against the workpiece W to be supported is connected to the left end portion of the clamping plate. The collet guide 11 is inserted in the guide part 61a of the clamping plate 61. The guide part 61a has a long hole lengthened in the lateral direction so that the collet guide 11 can slide in the lateral direction (the orthogonal direction). Therefore, the mandrel 13 can be adjusted at least a little for positioning the mandrel 13 by moving the mandrel along a surface of the workpiece W when the mandrel 13 is inserted into a formed hole Wa.

Thus, the collet guide 11 is supported so as to be movable along the surface of the workpiece W by the slide-support mechanism 6, so that a distance between the drill T attached to the drilling machine 100 and the clamping collet 12 of the clamping device 1 can be adjusted.

Figure 11:
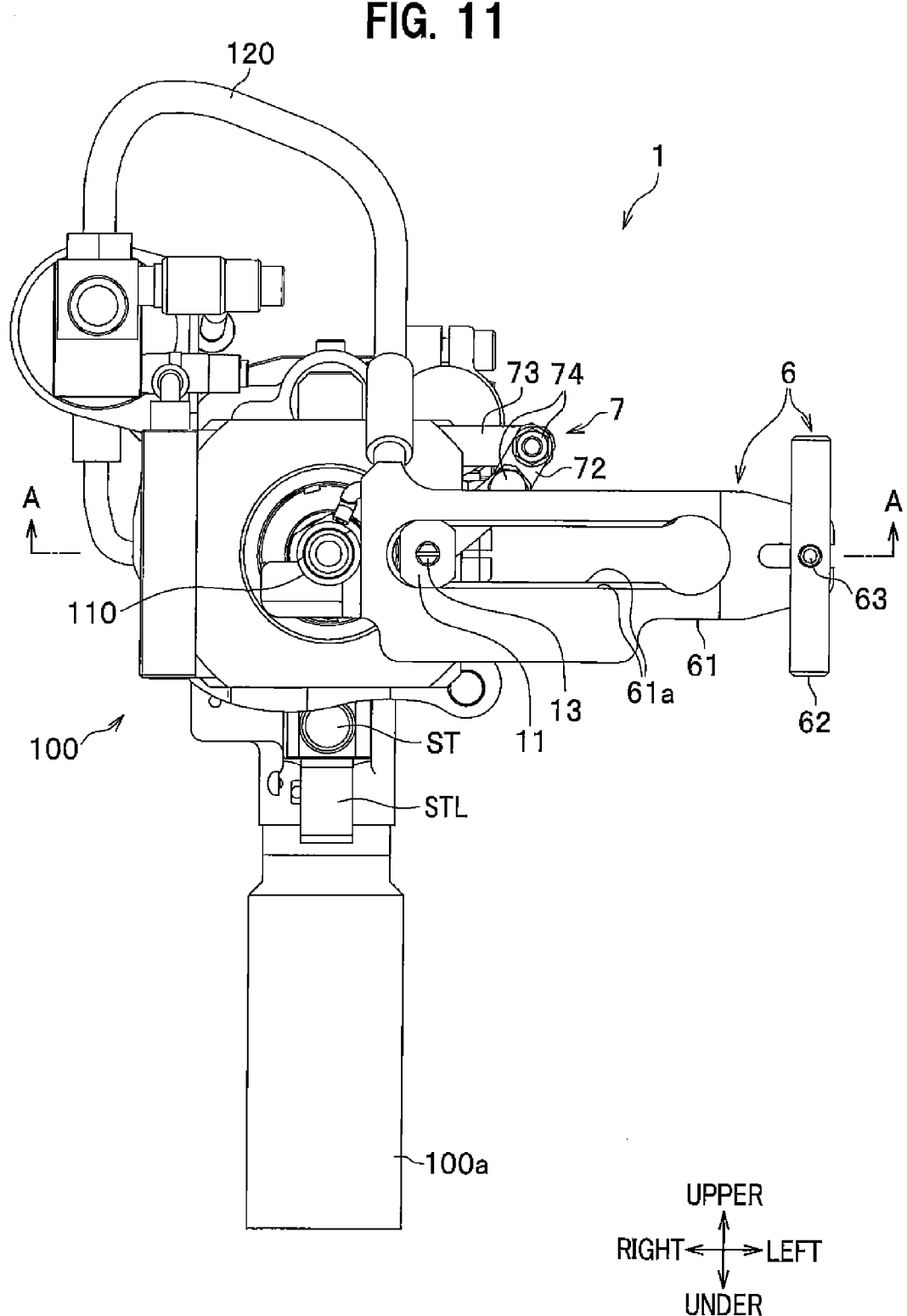
FIG. 11 is a front view showing the air-drive-drilling machine with the clamping device for a boring machine according to the embodiment of the present invention.
Figure 12:
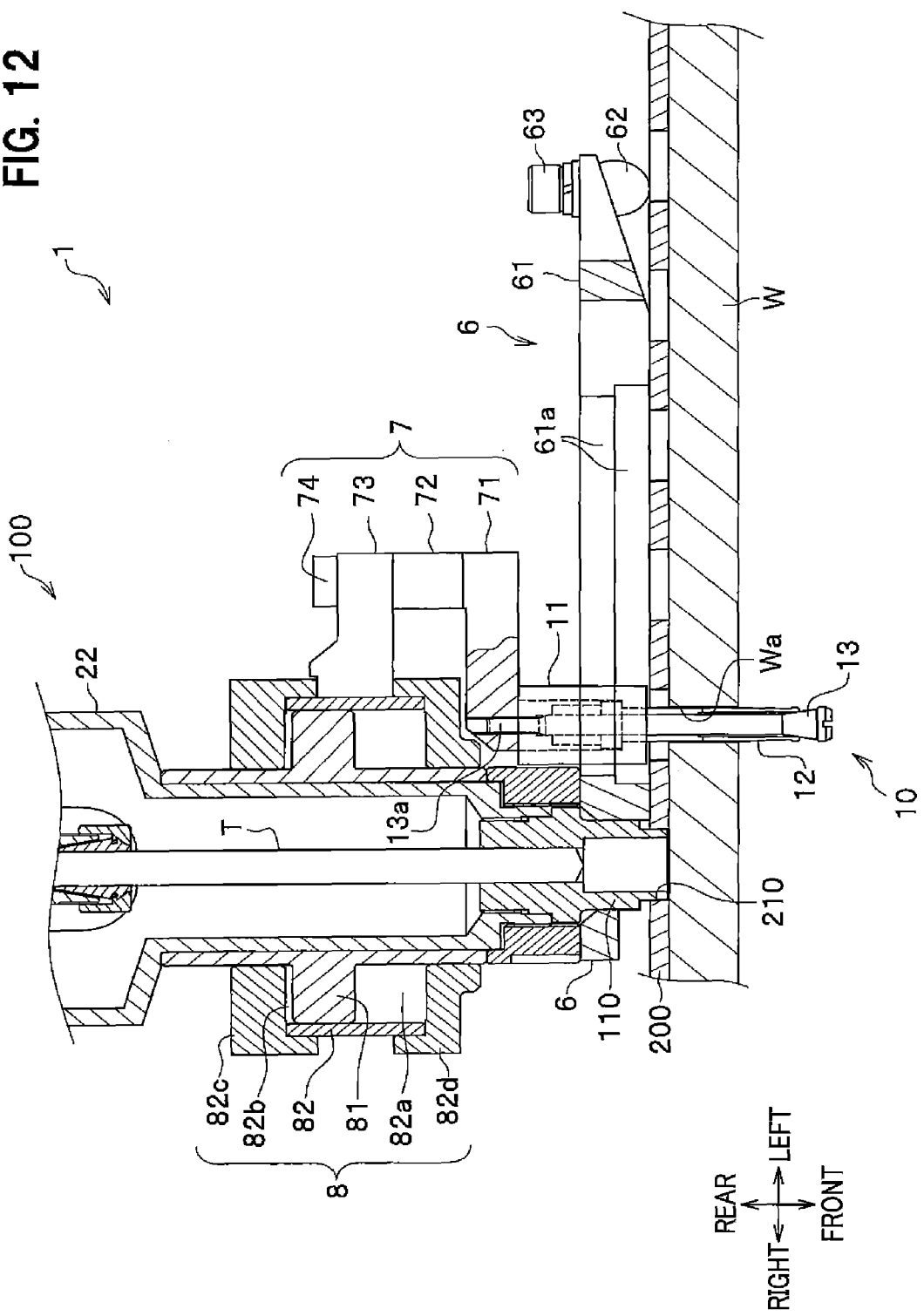
FIG. 12 is a partial schematic sectional view showing an installed state of the clamping device for a boring machine according to the embodiment of the present invention.

As shown in FIGS. 11 and 12, the height-adjusting plate 62 is an adjusting plate for supporting while abutting against the template 200 or the workpiece W (refer to FIG. 1), and is a long member having a semicircle shape in the cross section. The height-adjusting plate 62 is fixed at an appropriate position in the cut part 61b by the bolt 63, and adjusts the height of the clamping plate 61 from the workpiece W to move the collet guide 11 in parallel with the surface of the workpiece W. Furthermore, the height of the clamping plate 61 can be adjusted by loosening the bolt 63.

<Operation>

Operation of the clamping device 1 according to the present embodiment constituted in the manner described above will be described in order of boring works with use of the drilling machine 100 with reference to Figures. First, the clamping in which the workpiece W with the template 200 is held with use of the clamping collet 12 of the clamping unit 10 of the clamping device 1 will be explained.

As shown in FIG. 1, a formed hole Wa is formed in the workpiece W as a standard hole in a preparing step for boring the workpiece W by the drilling machine 100. Next, the template 200 is positioned on the workpiece W by using the formed hole Wa already bored as a positional reference, and then, is fixed to the workpiece W by screws (not shown).

Next, as shown in FIG. 7, an inserting step is done. The inserting step is a step in which the clamping collet 12 and the mandrel 13 are inserted into the formed hole Wa of the workpiece W through a guide hole 210 of the template 200 positioned at the same position as the formed hole Wa. A worker inserts the front end part 110 of the drilling machine 100 into the specific guide hole 210 of the template 200. At this time, the worker moves the collet guide 11 with use of the slide-support mechanism 6 to adjust a distance between the drill T and the clamping collet 12 so as to match a pitch of holes to be bored in the workpiece W.

After that, pressurized air is supplied to the front pressure chamber (first pressure chamber) 82a from the pressurized fluid-supply device A shown in FIG. 8 by pressing down the clamping button 92 equipped on the upper portion of the grip 100a shown in FIG. 1. Hereby, a piston-cylinder-driving step in which the piston-cylinder mechanism 8 is driven is done.

Next, when the pressurized air is supplied to the rear pressure chamber 82b, the movable cylinder 82 is urged to move rearward, so that the mandrel 13 through the connecting mechanism 7 is withdrawn. Hereby, the clamping collet 12 is expanded by the tapered part 13b of the mandrel 13. The clamping collet 12 presses on the defined wall surface of the formed hole Wa of the workpiece W to clamp the workpiece Wa and the template 200. Thus, a clamping step is done so that the clamping collet 12 is fixed to the workpiece W.

Further next, the start-lock button STL shown in FIG. 3 is pressed down, so that the pressurized air is supplied to the start button ST through the start-lock button STL. Hereby, pressing down the start button ST is enabled. The ram 3, the drill T and so on of the drilling machine 100 advance from the retreated position shown in FIG. 3 by pressing down the start button ST. The mist air is jet out of the tip of the drill T when the ram 3 advances by a predetermined distance. Furthermore, the air motor 5 is driven for rotating, so that the spindle 5a and the drill T start to rotate. Thus, the boring work starts, so that the boring work step in which a plurality of holes are bored in the workpiece W by the drill T is done.

In the drilling machine 100, the return air RA described before is flown into the spool valve V2 (refer to FIG. 3) to close the channel L1 by pushing the automatic return button AR with the micro-adjust screw 49 shown in FIG. 4 when the ram 3 is advancing. Hereby, the advancing movement of the ram 3 is stopped, and then, the ram 3 retreats to the retreated position. And rotating of the spindle 5a is stopped when the ram 3 moves by a predetermined distance.

The mandrel 13 and the collet adjuster 15 advance through the connecting mechanism 7 by advancing the movable cylinder 82. Furthermore, the collet adjuster 15 advances the clamping collet 12 through the spring 14, and the engagement part 12a of the clamping collet 12 abuts against the collet guide 11. Thus, the clamping collet 12 is reduced in diameter, so that the clamping collet 12 becomes to be unclamping state against the formed hole Wa of the workpiece W.

And then, the clamping collet 12, the mandrel 13 and so on are removed out of the formed hole Wa of the workpiece W which is a reference hole and is also for positioning the template 200 by retreating the clamping device 1 rearward. Hereby, the boring work is finished.

As shown in FIG. 7, in the clamping device 1 according to the present invention, the piston-cylinder mechanism 8 is equipped on the middle part (the front part) of the nose piece 22 so that the movable cylinder 82 moves forward and rearward along the same axis as the nose piece 22. Hereby, the piston-cylinder mechanism 8 can be disposed near the axis of the nose piece 22 to make the whole of the clamping device 1 simple and compact.

And the portable air-drive-drilling machine with the clamping device 1 is capable of moving the collet guide 11 in the orthogonal direction because the collet guide 11 which is engaged in the guide part 61a of the clamping plate 61 and supports the clamping collet 12 movably forward and rearward, is connected to the movable cylinder 82 of the piston-cylinder mechanism 8 through the connecting mechanism 7 which is the link mechanism. Hereby, the portable air-drive-drilling machine with the clamping device 1 or the drilling machine 100 is capable of forming holes precisely and quickly when a plurality of holes are bored in a workpiece W, so that workability and efficiency for boring can be improved.

In the case of using the template 200, after one hole is bored in the workpiece W, a boring machine (drilling machine 100) is withdrawn rearward together with the clamping device 1 in order to remove the front end part 110 of the boring machine from the guide hole 210 of the template 200. And then, the clamping collet 12 and so on of the clamping unit 10 are inserted into a certain hole already bored, for example, the one hole said above, and the front end part 110 of the boring machine is inserted into another guide hole 210 of the template 200. Hereby, a new hole can be bored at that position.

On the other hand, in the case of no use of the template 200, after one hole is bored in the workpiece W, a boring tool (drill T) is retreated to the retreated position. And the collet guide 11 and the guide part 61*a* are slidably moved relatively to each other while the clamping collet 12 is in the formed hole Wa of the workpiece W to fix, that is, in the clamping state, so that the boring machine attached with the clamping plate 61 can be moved to a desired position of the workpiece W to bore a new hole at that position.

The present invention is not limited to the above embodiment, and may have various modifications or changes within the technical idea thereof. The range of the present invention includes such modifications and changes.

For example, the drilling machine 100 driven by the air motor 5 is used as a boring machine in the present embodiment. However, the present invention is not limited to that embodiment, and may be also applied to other types of boring machine driven by a hydraulic motor, an electric motor, or the like.

Furthermore, with respect to the invention of the clamping device, the piston-cylinder mechanism 8 is not limited to a mechanism driven by pressurized air, and may be a mechanism using a cylinder mechanism driven by oil pressure. The ram-advancing-force-control mechanism 4 may be a mechanism using a gear train driven by a motor, or the like.

And the drill T is described as an example of a tool in the present embodiment. However, the tool may be a rotary tool capable of boring a workpiece W while rotating, and capable of moving forward and rearward like a tap, a reamer, or an end mill.

DESCRIPTION OF REFERENCE NUMERALS

1 Clamping device
2 Body
6 Slide-support mechanism
7 Connecting mechanism
8 Piston-cylinder mechanism
10 Clamping unit
11 Collet guide
12 Clamping collet
13 Mandrel
14 Spring
22 Nose piece
26 Adjusting-thrust nut
61 Clamping plate (guide member)
81 Fixed piston
82 Movable cylinder
82*a* Front pressure chamber (first pressure chamber)
82*b* Rear pressure chamber (second pressure chamber)
91 Unclamping button
92 Clamping button
100 Drilling machine (driven by pressurized air) (boring machine)
ST Start button
T Drill (boring tool)
W Workpiece
Wa Formed hole

What is claimed is:

1. A clamping device for a portable boring machine, the clamping device being mounted on a front part of a body of the portable boring machine and being for clamping the portable boring machine and a workpiece together, comprising:
   a fixed piston fixed on an outer periphery of the front part of the body;
   a movable cylinder covering the fixed piston, the movable cylinder being movable in an axial direction of a spindle of the portable boring machine;
   a first pressure chamber and a second pressure chamber which are formed in an inside of the movable cylinder and face each other across the fixed piston in a front-rear direction;
   a fluid supply device capable of supplying pressurized fluid into each of the first pressure chamber and the second pressure chamber to move the movable cylinder in the axial direction;
   a connecting mechanism, an end portion of which is connected to the movable cylinder, wherein the connecting mechanism is formed of a link mechanism, and is rotatable around a shaft lengthened in the axial direction relatively to the movable cylinder;
   a clamping unit connected to the other end portion of the connecting mechanism, the clamping unit being capable of being fixed to a certain position of the workpiece; and
   a guide member for supporting the clamping unit so as to be able to move the clamping unit in an orthogonal direction orthogonal to the axial direction;
   wherein the connecting mechanism connects the movable cylinder and the clamping unit so as to move together with the movable cylinder in the axial direction, and
   wherein the clamping device moves the clamping unit in a direction for clamping and moves the clamping unit in the reverse direction for unclamping through the movable cylinder and the connecting mechanism, using the fluid supply device.

2. The clamping device for a portable boring machine according to claim 1, wherein the clamping unit comprises:
   a clamping collet to be inserted into a hole of the workpiece formed by the portable boring machine, and to be held at the position of the hole of the workpiece;
   a mandrel to be slidably inserted into the clamping collet, and the mandrel being fixed to the other end portion of the connecting mechanism;
   a spring urging the clamping collet in a forward direction relatively to the mandrel; and
   a collet guide disposed to be incapable of moving in the axial direction, and the collet guide guiding the clamping collet slidably in the axial direction and regulating the movement of the clamping collet at a predetermined position in the axial direction.

3. The clamping device for a portable boring machine according to claim 2, wherein the guide member supports the collet guide so that the collet guide can freely move in the orthogonal direction.

4. A portable air-drive-drilling machine with a clamping device, comprising the boring machine and the clamping device according to claim 3, wherein the boring machine is a drilling machine to be driven by pressurized air, and the pressurized fluid is pressurized air, and wherein a clamping button and a start button are independently provided, the clamping button actuating the clamping device for clamping, and the start button actuating the drilling machine for boring.

5. A portable air-drive-drilling machine with a clamping device, comprising the boring machine and the clamping device according to claim 2, wherein the boring machine is a drilling machine to be driven by pressurized air, and the pressurized fluid is pressurized air, and wherein a clamping button and a start button are independently provided, the clamping button actuating the clamping device for clamping, and the start button actuating the drilling machine for boring.

6. A portable air-drive-drilling machine with a clamping device, comprising the boring machine and the clamping device according to claim 1, wherein the boring machine is a drilling machine to be driven by pressurized air, and the pressurized fluid is pressurized air, and wherein a clamping button and a start button are independently provided, the clamping button actuating the clamping device for clamping, and the start button actuating the drilling machine for boring.

* * * * *